US007882312B2

(12) United States Patent
Spencer

(10) Patent No.: US 7,882,312 B2
(45) Date of Patent: Feb. 1, 2011

(54) STATE ENGINE FOR DATA PROCESSOR

(75) Inventor: Anthony Spencer, Nr. Wotton under Edge (GB)

(73) Assignee: Rambus Inc., Sunnyvale, CA (US)

( * ) Notice: Subject to any disclaimer, the term of this patent is extended or adjusted under 35 U.S.C. 154(b) by 82 days.

(21) Appl. No.: 10/534,430

(22) PCT Filed: Nov. 11, 2003

(86) PCT No.: PCT/GB03/04867

§ 371 (c)(1),
(2), (4) Date: Jul. 18, 2005

(87) PCT Pub. No.: WO2004/044733

PCT Pub. Date: May 27, 2004

(65) Prior Publication Data

US 2005/0257025 A1    Nov. 17, 2005

(30) Foreign Application Priority Data

Nov. 11, 2002 (GB) .................................. 0226249.1

(51) Int. Cl.
G06F 12/00 (2006.01)
(52) U.S. Cl. ...................... 711/154; 711/163; 710/240; 712/20; 712/22
(58) Field of Classification Search ................ 711/141, 711/154, 163; 710/240; 712/20, 22
See application file for complete search history.

(56) References Cited

U.S. PATENT DOCUMENTS

| 5,751,987 | A | | 5/1998 | Mahant-Shetti et al. |
| 5,822,608 | A | * | 10/1998 | Dieffenderfer et al. ........ 712/20 |
| 6,088,771 | A | * | 7/2000 | Steely et al. ................. 711/154 |
| 6,097,403 | A | | 8/2000 | McMinn |
| 2001/0021967 | A1 | * | 9/2001 | Tetrick ........................ 711/163 |
| 2002/0062415 | A1 | * | 5/2002 | Wang et al. ................. 710/240 |

OTHER PUBLICATIONS

International Search Report of PCT/GB2003/04867 dated Feb. 8, 2005.
Ingersoll, S., et al., "Dataflow computation with intelligent memories emulated on field-programmable gate arrays (FPGAs)," Microprocessors and Microsystems, vol. 26, No. 6, Aug. 2002, pp. 263-280, Great Britain.
Elliott, D., et al., "Computational RAM: Implementing Processors in Memory," IEEE Design & Test of Computers, IEEE Computers Society, vol. 16, No. 1, Jan. 1999, pp. 32-41, United States.

* cited by examiner

*Primary Examiner*—Yong Choe
(74) *Attorney, Agent, or Firm*—Michael A. Glenn; Glenn Patent Group

(57) ABSTRACT

A state engine receives multiple requests from a parallel processor for a shared state. The state engine includes at least one state element and the at least one state element is adapted to operate, atomically, on the shared state in response to a request made by the parallel processor. The request includes at least a command directing the at least one state element on how to perform an operation on the shared state. The state engine also includes a memory connected to the at least one state element and configured to store the shared state.

27 Claims, 7 Drawing Sheets

STATE ENGINE FOR DATA PROCESSOR

FIELD OF THE INVENTION

The present invention relates to State Engines for use in data processors, especially parallel processors.

BACKGROUND TO THE INVENTION

Situations often arise whereby functions must be performed on a continuous stream of data. If the functions are implemented in software on a processor, then each datagram (packet of data) which arrives in sequence from the stream must be stored, processed and then forwarded. This process will take some finite quantity of time to execute. As the rate of packet arrival increases there will come a point at which a single processor can no longer keep up. The function must then either be distributed across multiple processors arranged in a pipeline, or across multiple processors arranged in parallel—each receiving a packet from the stream in turn in some round robin sequence. Packets output from parallel processors are typically reordered before forwarding.

This is a well proven approach to high performance packet processing, but is limited in its scalability as the number of processors increases. Access to shared memories, be it for code or data, eventually becomes a bottleneck. Simultaneous R/W access to shared state will further add to the complexity of system control signalling in order to resolve contention.

This leaves the issue of high speed access to multiple items of shared state information by multiple parallel processors. As the number of processors and the complexity of their algorithms increases, address and data bandwidth requirement over the system bus to the shared data will also increase. This can then become a bottleneck. The State Element technology described later in this specification supports parallel processing systems by localising and managing serialisation to shared state.

A good case in point is the challenge of Traffic Management in network routers. A significant, recognised issue in per-flow Traffic Handling is that a number of items of state need to be maintained for each of a large number of queues. The implications of this are that: (a) a considerable volume of shared memory needs to be implemented; (b) a lot of memory address bandwidth is required if each queue requires separate accesses to be made to different (shared) state variables; and (c) the memory access latency is likely to be long, thus causing state blocking during modification to impact on performance.

Contention for shared state variables can be resolved by implementing state elements as described later. However, the state element concept in high performance systems is not a solution in itself. For maximum throughput and flexibility, a number of state elements are combined in a state engine. This allows multiple concurrent access to the shared state. The present invention aims to overcome the following problems:

1. Processors in parallel can create a high rate of access to the same item of state.
2. What happens if a given function needs to access multiple variables from the same address, ie needs to access and process a state record?
3. What if multiple functions executing in a processor on a single datagram each requires access to different, independently addressable tables of state variables or records?

In short, the fundamental problem being addressed is that of a high rate of state access. This problem must be solved in a flexible way which enables the easy scaling of both the quantity of state being stored and the rate of state access.

SUMMARY OF THE INVENTION

The present invention provides, in one aspect, a parallel processor comprising state element means providing coherent parallel accesses to shared state.

The parallel processor is preferably an array processor, such as a Single Instruction, Multiple Data (SIMD) processor. The parallel processor may further comprise means to serialise and/or synchronise multiple accesses/updates to said shared state.

The said state may comprise a single item of state or multiple items of state and may comprise a single storage location or a data structure in storage.

Operations on said state may be carried out as a fixed or hardwired set of operations. Further means may supply data to update said state. Means may also send a command and data to said state, whereby said operations are programmable.

A plurality of said state element means may be organised into state cell means, whereby operations on said state can be pipelined. There may be a plurality of said state cell means, whereby to allow multiple requests in relation to said state to be handled concurrently.

The state cell means may also include input and output interconnect means to provide access to and from said state cell means, a bus interface for said input and output interconnect means, said bus interface interfacing with a system bus, and a control unit interconnected with said system bus for controlling accesses to said state.

Each said state element means preferably comprises local memory, and each field of a data record is stored in a respective memory of a respective state element means.

Each said state element means preferably comprises a local memory for said state, an arithmetic unit adapted to perform an operation on said state in said local memory, and command and control logic to control said operation.

The invention also contemplates a computer system and a network processor incorporating a parallel processor as specified in any of the above statements.

The processor may be provided on a single silicon chip.

BRIEF DESCRIPTION OF THE DRAWINGS

The invention will now be described with reference to the drawings, in which.

DETAILED DESCRIPTION OF THE ILLUSTRATED EMBODIMENTS

Figure 1:
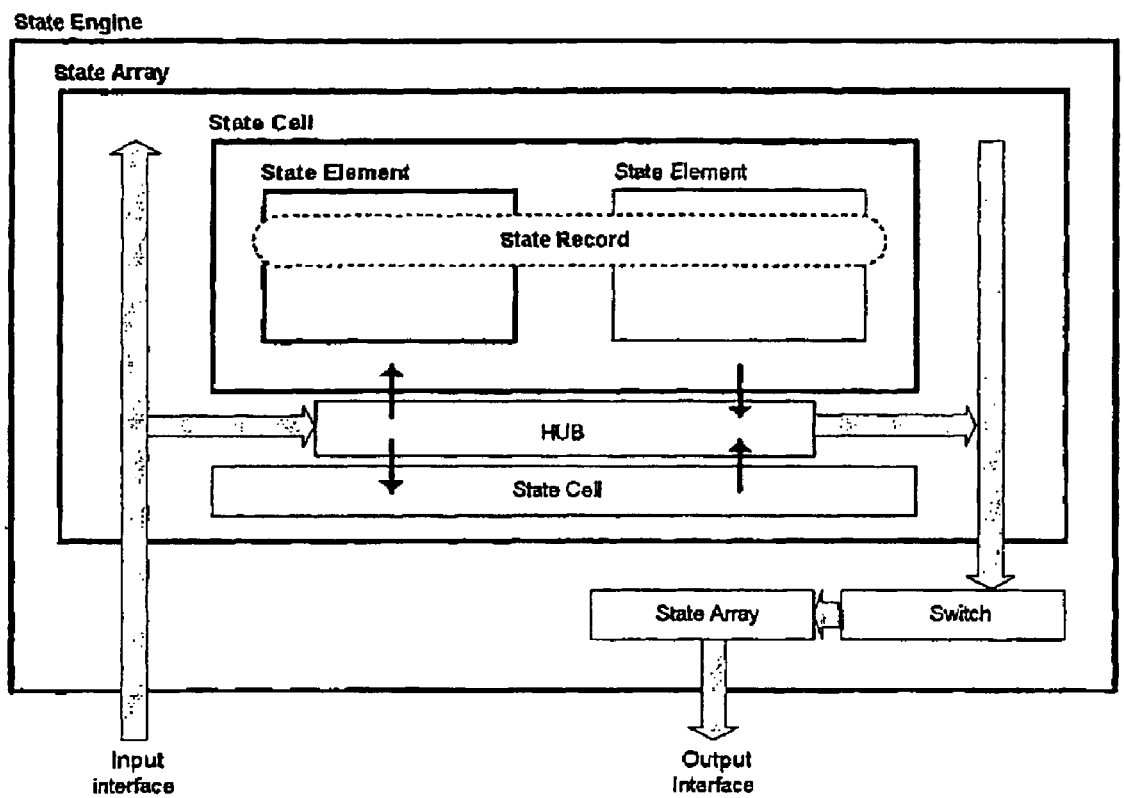
FIG. 1 is a schematic diagram of a State Engine using State Elements, all in accordance with the invention.

A particular design of State Element will now be described with reference to FIGS. 5 to 9. However, other designs are possible for inclusion in the State Engine.

A problem arises when pipelined or parallel processors share state variables for which both read and write access is required. Processors can not be permitted to simultaneously read/modify/writeback a shared variable since the result from the first writeback will be overwritten by the second. It is necessary to serialise the accesses.

This raises two significant issues:
1. A system for interlocking processors together must be implemented so that they may arbitrate for a resource and then lock it when there is contention. This control signalling can be complex and add significant functional and performance overhead.
2. When a processor has successfully negotiated for a resource, it should use that resource and then release it as soon as possible to limit the delay imposed on other processors. If access latencies are long to external memories, this can impact heavily on system performance.

Semaphores can be used to interlock processors or control logic and caches can be used to intercept concurrent accesses and serialise them. However, these can be complex, slow and/or require significant support tied into hardware. Embedded memory can reduce lock-out time, but delays can still be significant. The State Elements described in this specification adopt a different approach by which it is accepted that there is a serialisation point and a method is established to manage it rather than create an interlock. In broad terms, as will become clearer later, a function is co-located with local memory, the function performing the read, modification and write back in the memory rather than in the software. It is a physical solution rather than a software-based solution.

A disadvantage of this solution is that it "handcuffs" the software. Something that was previously programmable is now replaced by something else that blocks the software. These two aspects are interrelated. The first problem is the serialisation of the software but this has the consequence that, if the solution is by way of hardware, instead of having many tens of cycles of read/modify/write back turn-round time and complex control signals in the system, it will be reduced to within a couple of cycles but the entity that does the actual modification is now hardware. As well as removing the latency problem, this solution also responds to the other problem it introduces of potentially handling the software.

The ingenuity in this aspect of the present solution lies in the combination of re location of the logic close to the memory and making it semi-programmable.

State Elements are the key components in the present context which perform the serialisation of accesses into a shared memory. In the context of parallel processors, where simultaneous access to shared state is increasingly likely, there are potentially many state elements all in parallel, executing function calls from the parallel processors but instead of it all being SIMD, where the parallel processors are operating from a single instruction stream, the state elements operate in parallel but from individual instruction streams. They effectively operate in response to requests from processors.

The State Elements could be utilised in Multiple Instruction, Multiple Data (MIMD) architecture or, indeed, anywhere that there is a conflict to resolve. It is particularly applicable to SIMD architecture, however, because MIMD is more tolerant to indeterminism in memory access whereas SIMD prefers everything to be deterministic.

An advantage of this aspect of the invention is a reduction in the burden on the system bus. Normally, a function call is issued over the bus to instruct the state element to perform a function. A command is issued and the command results in a read request, data to be returned and modified data to be written back again. In the State Elements, instead of having three accesses across the system bus, there is now only one. Quite complex operations can thus be performed remotely, without having to keep sending information back to the processor.

In preferred implementations, the command line allows commands to be issued to access and modify a piece of memory or deposit micro-code in the state element. The state element therefore consists of a basic memory plus an Arithmetic Logic Unit (ALU), a controller unit where the microcode is written to, and special function units, such as addition units. Part of the design philosophy is to enable the element to become part of Applicant's toolkit, where required functions can be "bolted" on as necessary.

There is therefore flexibility on two levels. On the one hand the microcode in the memory can be changed so that, instead of performing operations like read/modify by adding a fixed operation that is passed to the command line to write it back, it is possible, with another piece of software, to read, add a value, hold, add another value and write back, for example. If a conditional read/modify/write back is desired, a condition block can be added on. If a history function is wanted, a history block, where sets of flags are maintained, can be provided. Thus, a control flag can be maintained, enabling future access, where one or other of two operations may be performed, based on that flag.

State elements are the key components which perform the serialisation of acesses into a shared memory. The state elements are combined in state engines and connected to a bus. The state element can be likened to a miniature, micro-coded ALU but the emphasis is on memory access rather than on the processing side. Primarily the state element comprises memory with an attached function which is flexible but with the emphasis on rapid transfer of data in and out of the memory. It performs a function on the memory, which is flexible.

In systems such as data packet queue controlling systems using a single processor, there is no contention when the processor seeks data from memory. The state of the packet queues are available to a single processor. A single processor can hold up to 10,000 such queues. However, in contrast, consider the situation where a plurality of processors share access to certain states in memory. At any instant, more than one processor may need to update the state of the same, one queue. There is therefore greater potential for contention. If contentions were to be avoided by replicating the processors, there would be greater complexity, especially as regards taking measures to preserve coherence of state across the processors and the amount of storage needed. There is therefore a demand for the states to be held in memory that is available to all processors but in such a way that the whole process is not slowed down to an unacceptable extent.

Figure 5A:
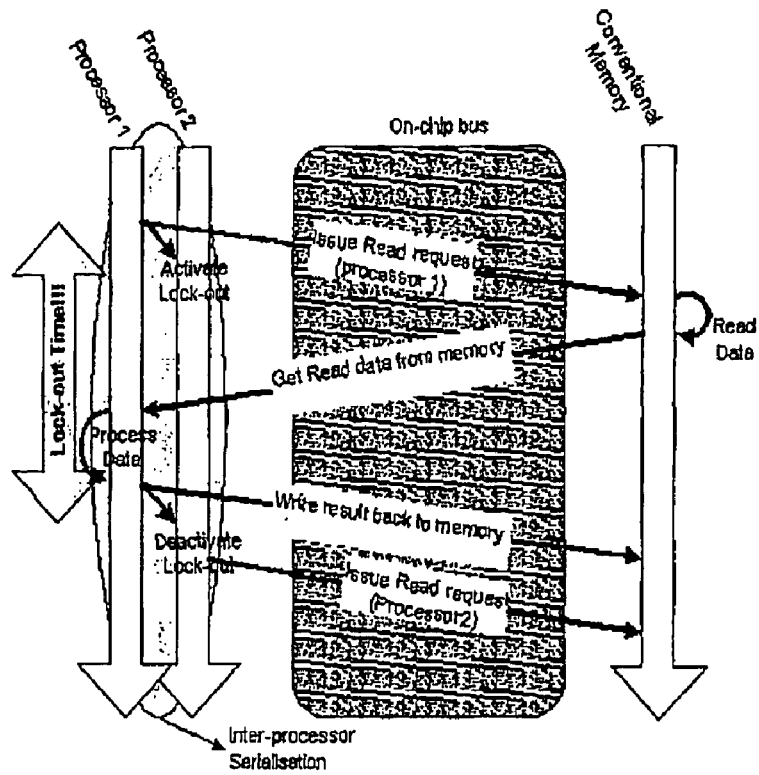
FIG. 5 illustrates the prior art method of accessing shared state contrasted with the benefits of using State Elements as embodied in the present invention.
Figure 5B:
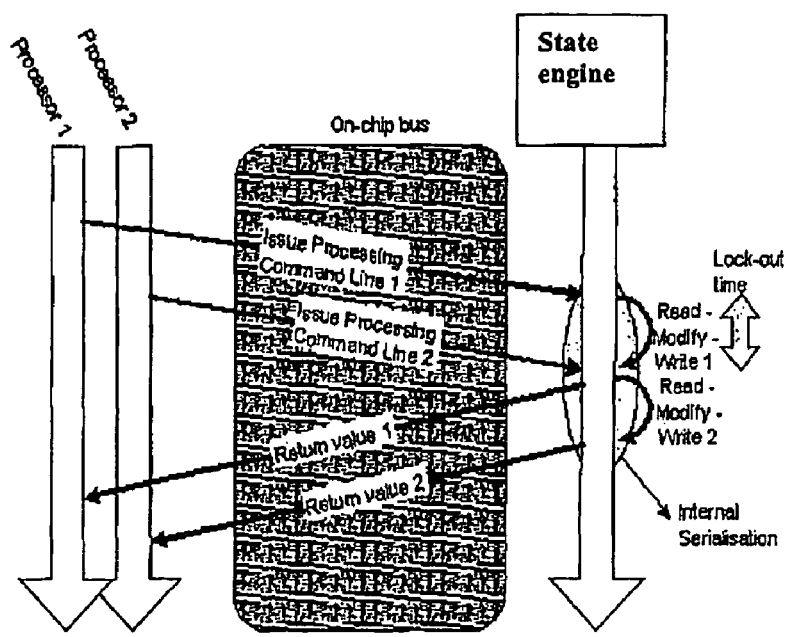

FIG. 5a illustrates schematically the type of problem that the present invention can overcome. The Figure represents a time line of a process involving conventional memory accessed via an on-chip bus in response to a request from one or other of two processors. There is assumed to be inter-processor serialisation. If processor 1, for example, issues a read request, the addressed data is read from memory and the data carried by the bus to the processor. The data is then modified in the processor and the result written back into memory via the bus. During this time, any other requests, for example from the second processor, are locked out. This is essential since the same data cannot be undergoing modification under the control of different processors at the same time. At the end of the lockout period, the memory once again becomes available to the next request. It is obvious that the lock-out period imposes considerable constraints on the speed of the overall process executed by the individual processors.

The State Elements provide an alternative to this known approach, which requires an arrangement in which parallel processors read from memory, modify, writeback data, and request the memory to perform the modification on its behalf. Instead, the State Element in the preferred implementation of the invention positions the serialisation point, not within/between each processor, but in a simple shared processor which has local and rapid access to the memory in which the shared state variables are stored.

The state element is analogous to an object in Object Oriented Design. It has privately stored data which is accessible only via the objects' methods. By issuing commands, parallel processors could be considered to be making method calls to the object.

Figure 6:
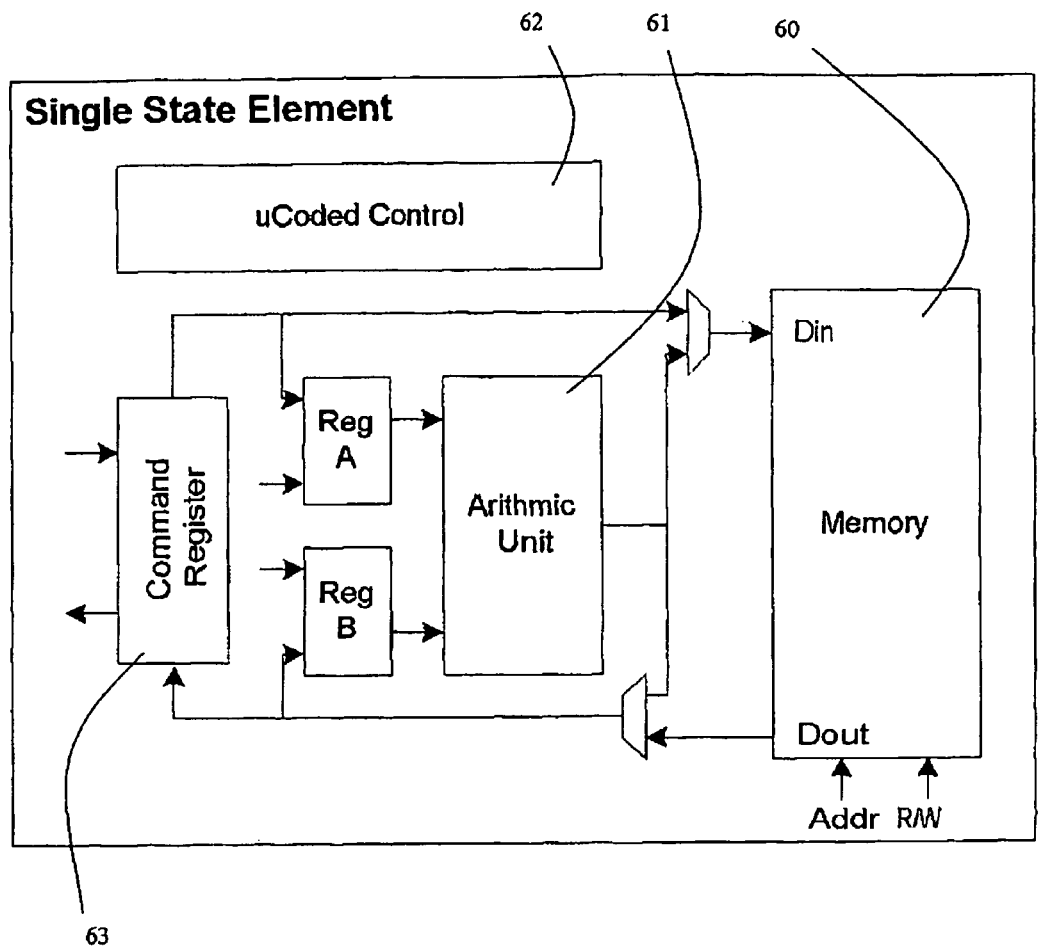
FIG. 6 is a functional overview of a State Element in accordance with the invention.

The preferred embodiment of state element comprises a small block of embedded memory 60 with single cycle read/write access time combined with a simple arithmetic and logic unit, as shown generically in FIG. 6. The Arithmetic Unit 61 receives commands (from processors) which comprise an address, data and a command code. The address identifies the state variable which is to be accessed, the data provides operands which a simple computer uses to modify the variable, and the command 62 selects a locally stored thread of programmed microcode 63 which is able to read, modify and writeback the state variable within a very small number of system clock cycles. The result can be returned to the processor that issued the command.

Details of the Embodiment

Figure 7:
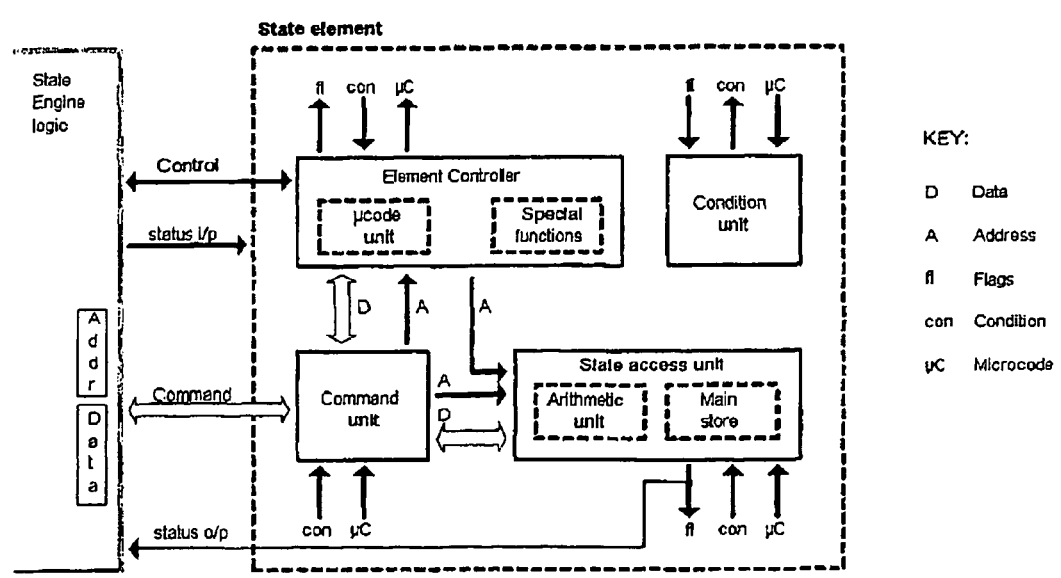
FIG. 7 is an implementation overview of a State Element.

A state element comprises an embedded memory and an attached function. The function could either be hardwired (a finite state machine) or a programmable, microcoded circuit. The latter approach is the more versatile and complex. A more complete picture of the system of component modules and their interconnection is shown in FIG. 7. Note the presence of special function and condition blocks. These greatly extend the functional capability of the element.

The emphasis in state element design is on the rapid memory access speed, not the processing capability. Embedded memory blocks are small enough that single cycle access time is achievable. Configurable read/modify/write back (R/M/W) is possible within a two cycle period as it is possible to perform a simple arithmetic operation on the result of a read and have it turned around for writeback within the second cycle. Typically, a command could be fully processed within 3 to 5 clock cycles.

Figure 8:
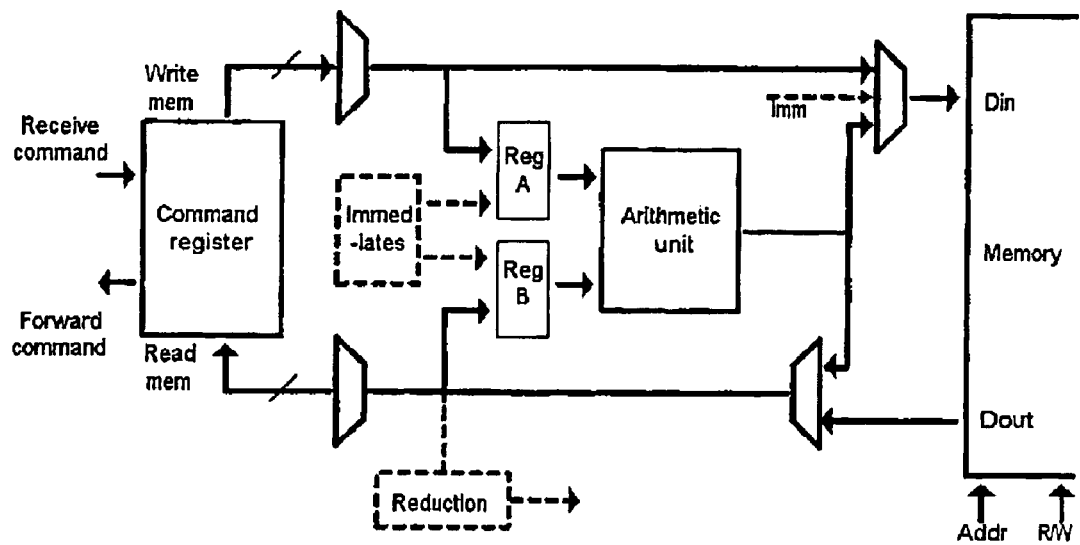
FIGS. 8 and 9 show respective examples of preferred implementations of the state and command units of a State Element.
Figure 9:
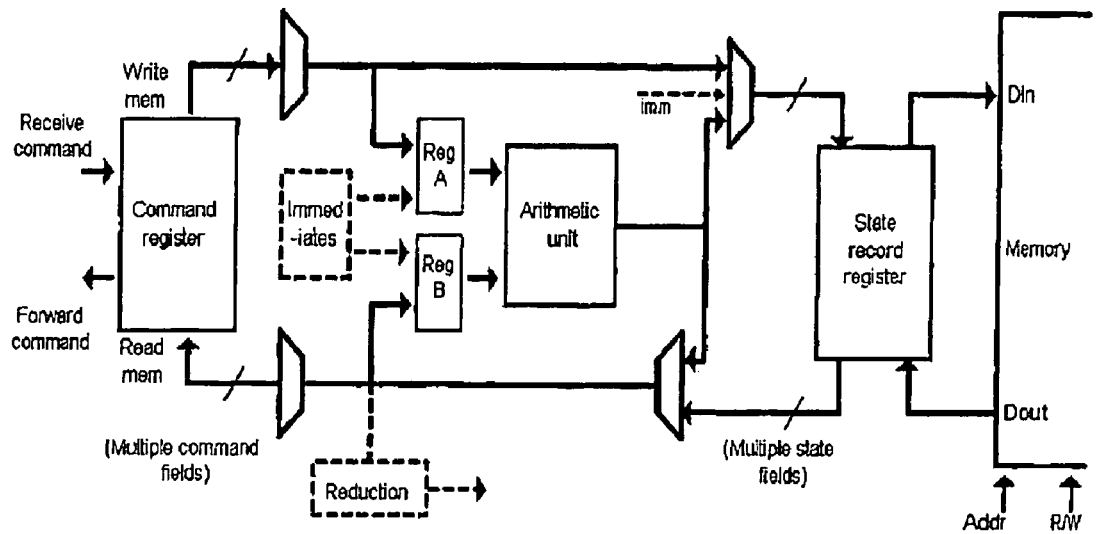

FIG. 8 illustrates the simplicity of the arithmetic unit, and how the path between the command line and the memory has minimal delay. FIG. 9 shows a more complex variant in which multiple items of state are held in memory. The impact on the command line turnaround (and microcode store size) is significant. However, this is not to say that the FIG. 9 circuit could not be used in appropriate circumstances. For example, in a lower performance system with a more complex set of state it could be the preferred approach.

General Overview of the State Engine

A state engine can be built up in a structured and well defined manner using a state element as an atomic part. Just as atoms are the components of molecules, which may be the building blocks of simple cells, which then combine into simple organisms, state elements can be combined into state cells, which are multiplied into state arrays, which in turn may be grouped together to form state engines. Although specific state element designs are described later in this context, the present invention encompasses state engines using other state elements.

This hierarchical design framework is illustrated in FIG. 1. The component parts shown are:

State Record—This is a conceptual entity and consists of a group of one or more state variables which have a given base address.

Command line—A message sent by a processor to the state engine. Fields in the command line include command code, address and data. The processor is effectively requesting that the function indexed by the command code be performed on the state record at the given address. Parameters can be both supplied and returned in the general purpose data field.

State Element—A state element is a small, private memory which contains state variables accessible only via functions executed by the state element's control logic. Functions typically read a state variable, perform some modification and write a new value back. The result may also be recorded in a data field in the command line. The primary role of the state element is to manage the state access serialisation point by executing a simple function on memory at maximum speed. A specific implementation of a state element has already been described in this specification.

State Cell—If there is more than one state variable in a record, it is permissible for the entire record to be stored as an entry within a single state element However, as each field in the record would need to be processed in turn this would throttle the available bandwidth to the state. In the State Cell each field of the record is stored as a single state variable in its own State Element. These State Elements are then chained together in a pipeline. The command line passes from one Element to the next, the same address and control word being used at each stage to pick a different field from a common record and perform some function on it. State cell logic provides synchronisation between its constituent Elements which effectively make up a memory oriented pipelined processing system.

The primary role of the State Cell is thus to provide a means of constructing simple, pipelined processors which enable more complex state records to be handled at high speeds.

Figure 2:
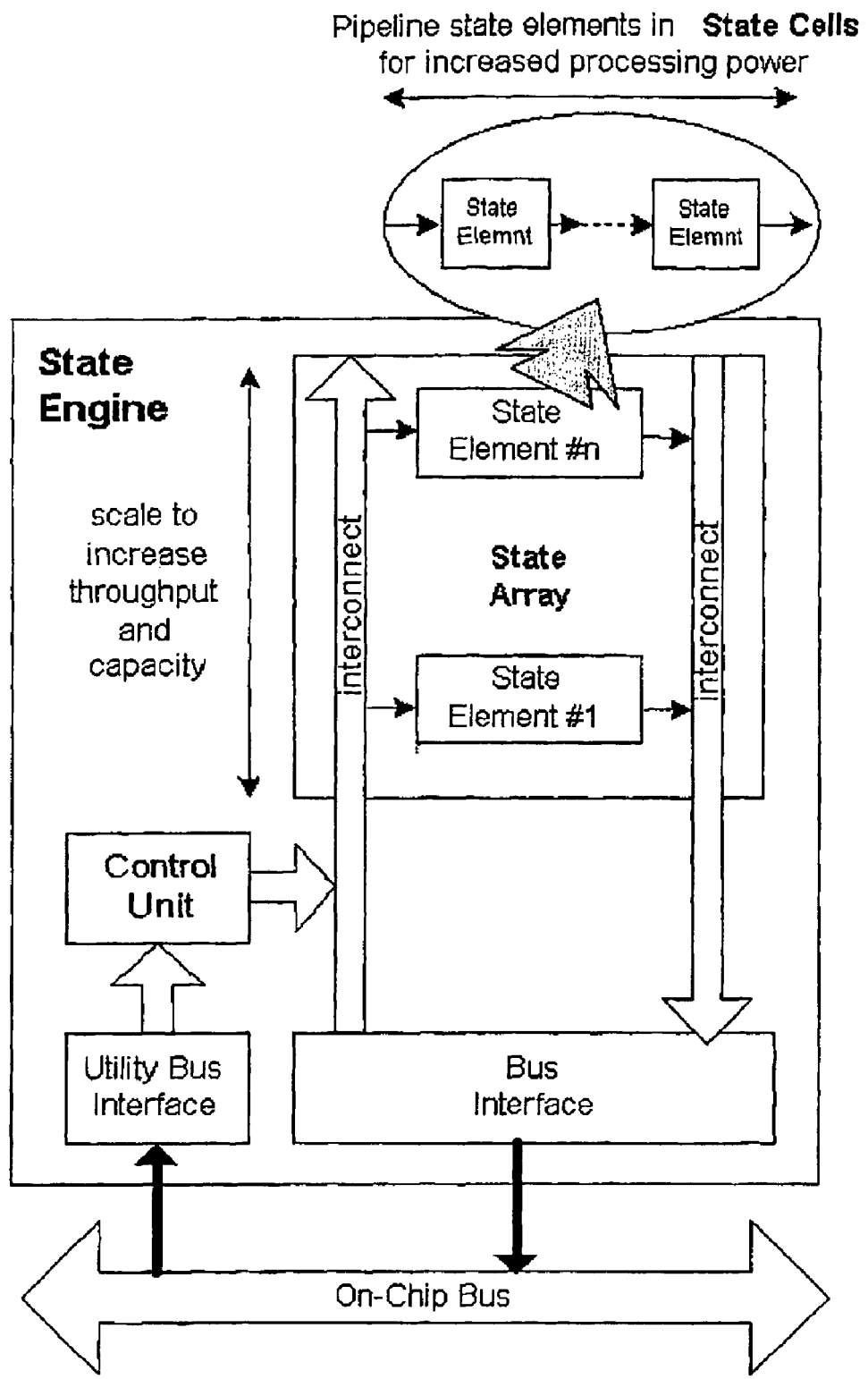
FIG. 2 is a functional representation of the State Engine.

State Array—The embedded memory used in the State Elements of State Cells must be relatively small in volume for rapid (ideally single cycle) access. This places a limit on the number of instances of a state record which may be stored in a single State Cell. To increase the quantity of state, State Cells of a given type can be tiled to form a large State Array. Scaling during device layout is simplified by the State Array interconnect. The segmentation of an interconnection framework and the coupling of adjacent Cells in a tiled array using well defined interfaces is shown in FIG. 2. The interconnect preserves order between accesses to the same State Cells. Since order preservation amongst command lines accessing different State Cells is not required, there is no need for the latency of command line accesses to different Cells across the array to be balanced. The Array is scalable in a simple way and is layout-friendly.

Increasing the total state storage volume by multiplying State Cells can also increase overall state access bandwidth as the throughput of an individual State Cell is likely to be a little lower than that of the interconnect. If the number of State Cells is increased to the point that the interconnect becomes the limiting factor then aggregate throughput can be further increased by providing multiple interconnect channels, each channel accessing a different portion of the array (ie. table). This is analogous to designing a memory system with multiple, independently addressable channels to increase random access bandwidth.

The primary role of the state array is to provide scalable capacity. It also provides a means for scaling address and data bandwidth.

State Engine—The State Engine combines State Arrays with all the additional glue logic and facilities that are required to construct a block which can be configured and accessed via a system bus. Components include:

Bus interface logic

System control logic—The state engine controller may issue private) system commands to the state arrays. These commands are invoked by external blocks through accesses to the controller via the utility bus interface. Only (public) state commands may arrive via the main data flow interfaces. System commands configure the arrays or extract diagnostic information.

Bypass logic—Bypass modes enable commands to skip arrays which they are not required to access. This will conserve power and bandwidth. The required extraction and insertion points can also be used by the system controller.

Inter-array switch connectors—This involves a new application of (Banyan) switching technology for routing accesses between tables. It may only be required when there is more than one independent route through each State Array.

State Engine Behaviours Include:

Message broadcasting—System commands can be broadcast throughout the memory arrays for retrieving status or passing configuration and control messages. This method is also used for loading microcode into state arrays.

Multiple accesses—If multiple arrays are connected in a pipe then it is evident that each command line must contain different address and command information for each array. A single command issued from the processor thus results in multiple state accesses.

Command line "morphing"—As command lines propagate from array to array they are used and sometimes updated as a result of each state element access. The data inserted into the command by state elements in one array could be used by the state elements in the next. Data and perhaps even addresses could be modified.

Details of the Embodiment

Figure 3:
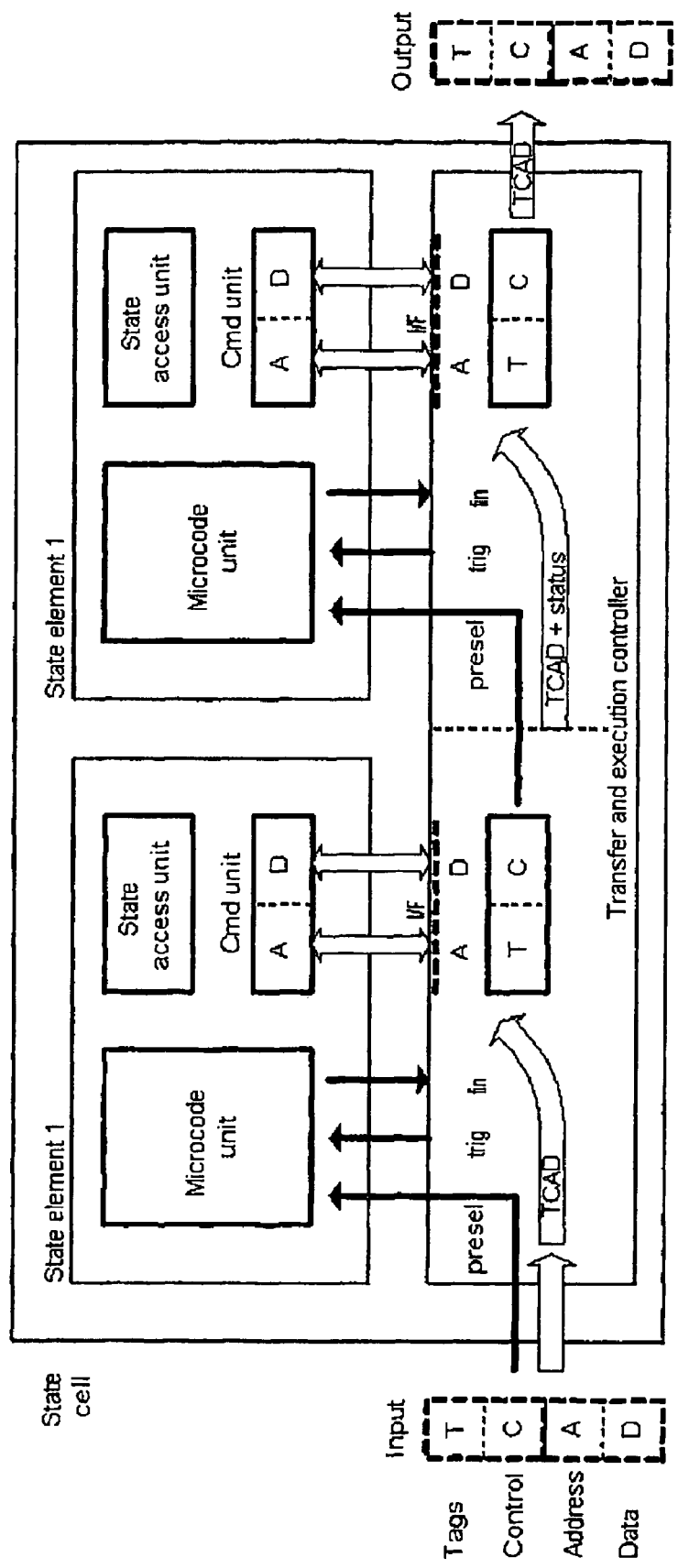
FIG. 3 is an implementation of a State Cell forming part of the State Engine.

The State Cell, which "stitches" State Elements together in a pipeline, is shown in FIG. 3. A pipeline of State Elements making up the State Cell store the component variables for a set of state records. Commands to access these state records arrive at the first State Element. The control field is used to determine the update made to the first component of the state record, in this example via a microcoded controller. The command line is then passed on to the next State Element to update the next component of the state record. This is repeated for the length of the pipeline in the State Cell. The result from the final stage of the pipeline is returned to the requesting processor.

Figure 4:
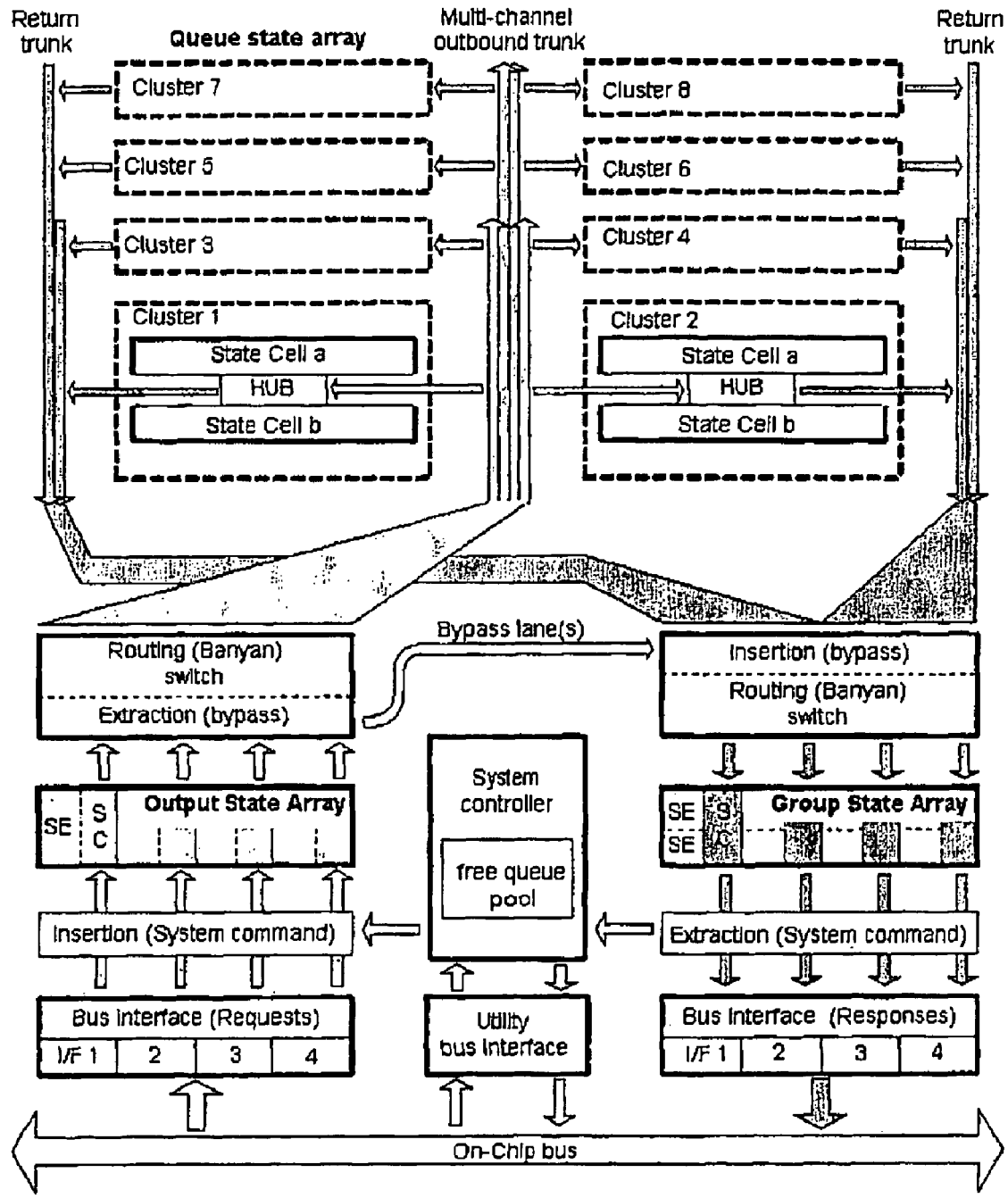
FIG. 4 is a specific implementation of the generic State Engine as a complex state engine designed for Traffic Handling and queue management.

The architecture of the State Array, and the interconnection of State Engine components is illustrated in FIG. 4. This uses standard/known routing and load balancing techniques to allocate incoming command lines to the appropriate state cells.

Additional Features

Load balancing—It is possible that state records may be allocated dynamically on demand (and also deassigned). If multiple paths exist through a given array then it is desirable for the stored state to be spread evenly across the available State Elements/Cells. The availability of state entries in such a system could be advertised by the Controller in such a way as to ensure that records are assigned from each Element in turn, thus balancing the load.

In essence, the preferred implementation of the invention therefore provides the following features, in which all of the specified issues associated with high speed data lookup by parallel processors are addressed:

A formal framework for creating a parallel coprocessor using smart memory (typically state elements).

Single access, multiple lookups—A single access acts upon multiple, independent state tables within the state engine, ie. multiple lookups into different tables held in different memories as a result of a single request from the bus.

Pipelined architecture—Lookups into different tables are not fired off from a point source into different memories. Instead, the access itself (in the form of a command line) is routed from table to table in a serial fashion. It is an object which travels through the State Engine.

Command line "morphing"—As command lines propagate along the pipe from table to table they are used and sometimes updated as a result of each table access. The data inserted into the command by one table could be used by the state elements in the next.

State cell concept—high throughput pipelined processing (scalable processing power)

State array concept—"layout friendly" scheme for scaling quantity of state, bandwidth and load balancing State engine concept—multiple orthogonal lookups from a single command uses switching technology for multi-lane state engine architectures. Controller provides system commands for data and instruction broadcasts.

State Elements can interact.

The problems addressed by the present invention are particularly suited to application to array processors accessing shared state in a Traffic Handling application. State engines were conceived as a way to arrange the state elements (required for managing state contention) in a way that addressed the additional issue of a high rate of state access.

However, State Engines can also be architected from the same or similar state elements to meet the needs of other applications—for instance meter management in the related area of Traffic Conditioning. State engines could therefore be used to deliver state element technology to any other application in which parallel (or even pipelined) processors access shared state at high rates.

Additional Optional Features

System threads:—Background, system threads could be programmed to operate on the data in the state memory when commands from processors are not being serviced. For instance, could be useful for identifying state entries which are idle.

Find free queue algorithm: —Find_free_queue system function. This is a background thread which implements a "Two strikes and out" algorithm for de-assigning state entries used to represent/manage queues which go idle (ie. empty).

Special function units:—The "flag unit" and "address unit" are special function units designed to support the find free queue algorithm. The features they provide are considered to be of generic value and could be used by other algorithms (such as that required for maintaining meters in state elements)

Scheduling algorithm:—The information required by the Self-Clocked Fair Queueing algorithm cannot be mapped directly into the state element. It is represented in a form which makes access and manipulation more robust and efficient.

It can therefore be appreciated that the State Elements forming part of the present invention can provide the following features:

Intelligent memory—The state element localises the serialisation of parallel data accesses at the memory end, not the processor end. This greatly reduces the latency commonly associated with the blocking of state.

Functional versatility—The state element provides a number of (configured/)programmed remote functions which may be performed on the stored data—functions would comprise a small number of data read, write, arithmetic operations and conditional accesses.

Flexibility—The functions can (but need not necessarily) be expressed in microcode so that the state element remains programmable and does not "tie" software executing on the processor to functions hardwired into the state element.

System efficiency—The read/writeback occurs between the ALU and the memory inside the state element. Only the command travels across the system bus. This reduces the burden on the system bus as compared with conventional approaches.

System simplicity—The read/modify/write is encapsulated within the state element and serialisation is inherently enforced by the state element logic. Processors can simultaneously issue commands which will cause a function to act on the same item of state without having to first negotiate with one-another.

There is no need to sort results on return—there is an automatic return to the requesting processor.

It is recognised that contention is not an issue exclusive to Traffic Handling, therefore state elements could also be used as a general purpose tool in support of parallel processors in any application. Contention can arise when any two processors in a realtime (data flow processing) system require R/M/W access to a shared state variable. State Elements could therefore be used in conjunction with any parallel or pipelined arrangement of processors.

The invention claimed is:

1. A state engine receiving multiple requests from a parallel processor for a shared state, the state engine comprising:
   at least one plurality of state elements means, said at least one plurality of state elements means adapted to operate, atomically, on said shared state in response to a request made by said parallel processor, wherein
   said request includes at least a command directing said at least one plurality of state elements means on how to perform an operation on said shared state, said operation including reading, modifying, and writing back said shared state; and
   a memory connected to said at least one plurality of state elements means and configured to store said shared state,
   wherein said plurality of state elements include a plurality of local shared memories which provide a composite bandwidth that is a sum of all bandwidths associated with each one of said plurality of local shared memories.

2. A state engine as claimed in claim 1, wherein the operation performed by said at least one state element means is a single read-modify-write operation.

3. A state engine as claimed in claim 1, wherein said shared state comprises a single item of state.

4. A state engine as claimed in claim 1, wherein said shared state comprises multiple items of state.

5. A state engine as claimed in claim 1, wherein said state comprises a single storage location or a data structure in storage.

6. A state engine as claimed in claim 1, wherein the operation performed by said at least one state element means is carried out as a fixed or hardwired operation.

7. A state engine as claimed in claim 6, further comprising means to supply data to update said shared state.

8. A state engine as claimed in claim 6, further comprising means for sending a command and data to said shared state, whereby said operation is programmable.

9. A state engine as claimed in claim 1, further comprising a plurality of said state element means organized into state cell means, whereby operations performed on said shared state are pipelined.

10. A state engine as claimed in claim 9, further comprising a plurality of said state cell means, whereby to allow multiple requests to be handled concurrently.

11. A state engine as claimed in claim 10, further comprising input and output interconnect means providing access to and from said state cell means, a bus interface for said input and output interconnect means, said bus interface interfacing with a system bus and a control unit of a processing element for controlling accesses to said shared state.

12. A state engine as claimed in claim 9, wherein each said state element means comprises local memory, and each field of a data record is stored in a respective memory of a respective state element means.

13. A state engine as claimed in claim 1, wherein each said state element means comprises a local memory for said shared state, an arithmetic unit adapted to perform the operation on said state in said local memory, and command and control logic to control said operation.

14. A state engine as claimed in claim 1, wherein said operation results in a change of said shared state.

15. A state engine as claimed in claim 1, wherein said state engine is a programmable entity capable of executing shared memory instructions.

16. A state engine as claimed in claim 1, wherein said memory is within said state element.

17. A state engine as claimed in claim 1, wherein state transactions are processed with said state engine and accesses to shared memory are passed on a system bus.

18. A state engine as claimed in claim 1, wherein each of said plurality of state elements includes a single serialization access point resulting in a plurality of serialization access points within said state engine.

19. A state engine as claimed in claim 1, wherein said plurality of state elements perform as a plurality of partitioned processing functions.

20. A parallel processor including a state engine, said state engine receiving multiple requests from said parallel processor for a shared state, the state engine comprising:
   at least one plurality of state elements means, said at least one plurality of state elements means adapted to operate, atomically, on said shared state in response to a request made by said parallel processor, wherein said request includes at least a command directing said at least one plurality of state elements means on how to perform an operation on said shared state, said operation including reading, modifying, and writing back said shared state; and a memory connected to said at least one plurality of state elements means and configured to store said shared state, wherein said plurality of state elements include a plurality of local shared memories which provide a composite bandwidth that is a sum of all bandwidths associated with each one of said plurality of local shared memories.

21. A parallel processor as claimed in claim 20, wherein said parallel processor is an array processor.

22. A parallel processor as claimed in claim 21, wherein said array processor is a SIMD processor.

23. A parallel processor as claimed in claim 20, implemented on a single silicon chip.

24. A parallel processor as claimed in claim 20, further comprising:

a plurality of state engines, wherein one or more of said state engines are applied to a system bus and wherein said one or more of said state engines operate separately from each other.

25. A computer system comprising a parallel processor, said parallel processor including a state engine, said state engine receiving multiple requests from said parallel processor for a shared state, the state engine comprising:

at least one plurality of state elements means, said at least one plurality of state elements means adapted to operate, atomically, on said shared state in response to a request made by said parallel processor, wherein said request includes at least a command directing said at least one plurality of state elements means on how to perform an operation on said shared state, said operation including reading, modifying, and writing back said shared state; and a memory connected to said at least one plurality of state elements means and configured to store said shared state, wherein said plurality of state elements include a plurality of local shared memories which provide a composite bandwidth that is a sum of all bandwidths associated with each one of said plurality of local shared memories.

26. A network processor comprising a parallel processor, said parallel processor including a state engine, said state engine receiving multiple requests from said parallel processor for a shared state, the state engine comprising:

at least one plurality of state elements means, said at least one plurality of state elements means adapted to operate, atomically, on said shared state in response to a request made by said parallel processor, wherein said request includes at least a command directing said at least one plurality of state elements means on how to perform an operation on said shared state, said operation including reading, modifying, and writing back said shared state; and a memory connected to said at least one plurality of state elements means and configured to store said shared state, wherein said plurality of state elements include a plurality of local shared memories which provide a composite bandwidth that is a sum of all bandwidths associated with each one of said plurality of local shared memories.

27. A state engine receiving multiple requests from a parallel processor for a shared state, the state engine comprising:

means for operating, atomically, on said shared state in response to a request made by said parallel processor, wherein said request includes at least a command directing said means for operating on how to perform an operation on said shared state, said operation including reading, modifying, and writing back said shared state;

a memory connected to said means for operating and configured to store said shared state; and means to supply data to update said shared state, wherein said state engine includes a plurality of state elements which comprise a plurality of local shared memories which provides a composite bandwidth that is a sum of all bandwidths associated with each one of said plurality of local shared memories.

* * * * *